(12) United States Patent
Paulk

(10) Patent No.: US 7,040,052 B1
(45) Date of Patent: May 9, 2006

(54) FISHING POLE WITH BITE ALERT SYSTEM

(76) Inventor: Ricky Paulk, 4225 57th Ave. North, St. Petersburg, FL (US) 33714

( * ) Notice: Subject to any disclaimer, the term of this patent is extended or adjusted under 35 U.S.C. 154(b) by 0 days.

(21) Appl. No.: 10/972,241

(22) Filed: Oct. 22, 2004

(51) Int. Cl.
*A01K 97/12* (2006.01)

(52) U.S. Cl. .......................................... 43/17
(58) Field of Classification Search .................... 43/17, 43/24
See application file for complete search history.

(56) References Cited

U.S. PATENT DOCUMENTS

| | | | |
|---|---|---|---|
| 1,752,397 A * | 4/1930 | See .............................. | 43/17 |
| 2,608,784 A * | 9/1952 | Sebastiano .................... | 43/17 |
| 3,238,659 A * | 3/1966 | Lamb, Jr. ...................... | 43/17 |
| 3,571,536 A * | 3/1971 | Sparks ........................ | 200/60 |
| 3,624,689 A * | 11/1971 | Rizzo ............................ | 43/17 |
| 4,276,711 A * | 7/1981 | Mathauser .................... | 43/17 |
| 4,399,631 A * | 8/1983 | Smith ............................ | 43/17 |
| 4,420,900 A * | 12/1983 | Nestor .......................... | 43/17 |
| 4,458,438 A * | 7/1984 | McCulley ...................... | 43/17 |
| 4,507,890 A * | 4/1985 | Thorne .......................... | 43/17 |
| 4,905,398 A * | 3/1990 | Botbyl .......................... | 43/17 |
| 5,097,618 A * | 3/1992 | Stoffel .......................... | 43/17 |
| 5,228,228 A | 7/1993 | Meissner ...................... | 43/17 |
| 5,261,180 A | 11/1993 | Foster .......................... | 43/17 |
| 5,396,726 A | 3/1995 | Zepeda ........................ | 43/17 |
| 5,738,433 A | 4/1998 | Sparks ...................... | 362/109 |
| 5,771,624 A | 6/1998 | Vickery ........................ | 43/17 |
| 5,996,268 A | 12/1999 | Buczkowski .................. | 43/17 |
| 6,125,573 A | 10/2000 | Wilczynski .................... | 43/25 |
| 6,446,380 B1 | 9/2002 | Radosavljevic ................ | 43/17 |

* cited by examiner

*Primary Examiner*—Kurt Rowan
(74) *Attorney, Agent, or Firm*—Goldstein Law Offices PC.

(57) ABSTRACT

A fishing pole bite alarm system, including a pager and a fishing pole having a handle, a mast, a plurality of fixed eyelets on the mast including a distal fixed eyelet, and a movable eyelet assembly hinged to the distal fixed eyelet. A fishing line extends through the fixed eyelets and through the movable eyelet assembly. A tension switch is located within the pole and is attached to the movable eyelet assembly by a control wire. When the fishing line is tensioned, the movable eyelet is pivoted, pulling the control wire in order to activate the tension switch. The tension switch activates a pole light that illuminates the mast and signals the pager to generate and audible alert.

1 Claim, 3 Drawing Sheets

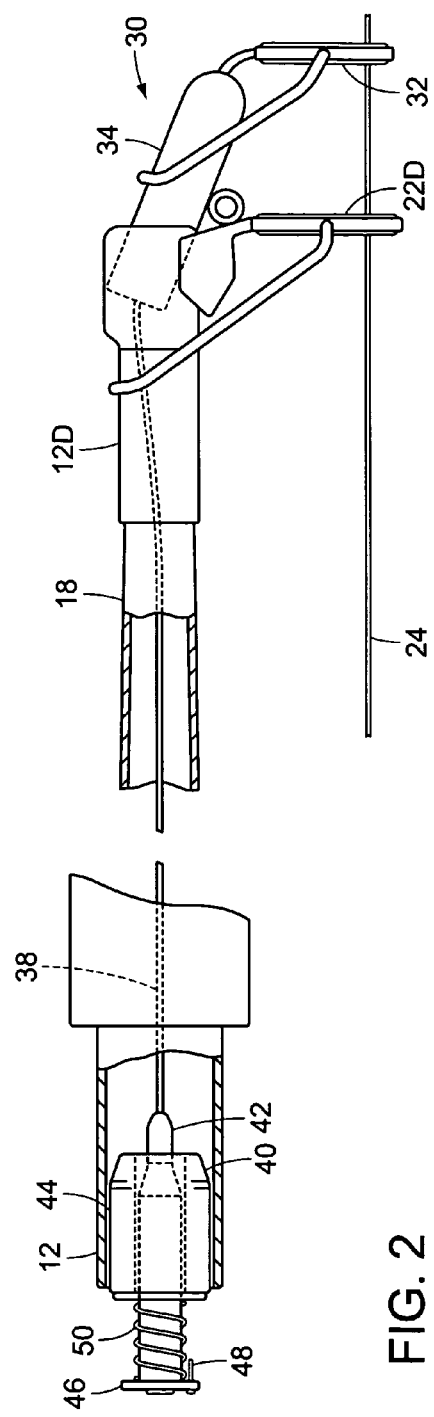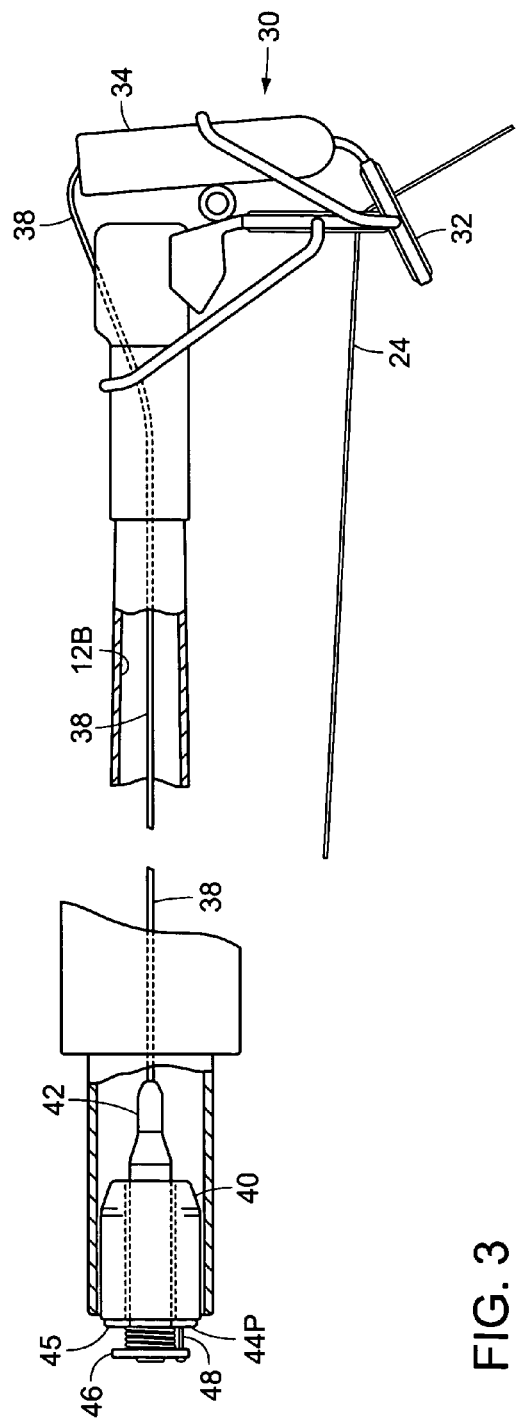
FIG. 2
FIG. 3

FISHING POLE WITH BITE ALERT SYSTEM

BACKGROUND OF THE INVENTION

The invention relates to a fishing pole with bite alert system. More particularly, the invention relates to a fishing pole that detects tension in its fishing line that reflects a fish bite and alerts a fisherman by illuminating a light and activating a beeper in response thereto.

The sport of fishing often requires a great deal of waiting time. In particular, once the line is cast, it may take minutes or even hours for a fish to bite. Once the fish does bite, or is just nibbling at the bait, however, it is important that the fisherman take hold of the pole and "hook" the fish. Further, once the fish is hooked, it must be reeled in promptly, or the fish might escape.

Because of the great amount of waiting time, the fisherman does not always wish to hold the fishing pole. In addition, often a fisherman sets up numerous fishing poles simultaneously. Determining when one of these poles has a bite is not always easy.

Various devices have been proposed which warn the fisherman of a bite. For example, bells are sometimes attached to the fishing line to indicate movement in the fishing line. Often however, such devices are not sensitive enough to the subtle movements that occur when a fish is nibbling at the bait. In addition, such devices are not suitable for environments where surf noise is dominant, and are useless when the fisherman has strayed a distance from the fishing pole.

Various electronic devices have been proposed that provide an alert to the fisherman. These devices tend to be unduly complex and are not well suited to sensitive detection of fishing line activity while allowing normal use of the fishing pole.

While these units may be suitable for the particular purpose employed, or for general use, they would not be as suitable for the purposes of the present invention as disclosed hereafter.

SUMMARY OF THE INVENTION

It is an object of the invention to provide a fishing pole having an incorporated alert system that warns the fisherman of fishing line activity that indicates that a fish is biting. Accordingly, the fishing pole detects an increase in line tensioning and signals an alert to the fisherman.

It is another object of the invention to provide a fishing pole alert system that does not interfere with the useage of the pole. Accordingly, the system detects tensioning in the line by means of a hinged eyelet at the distal end of the pole. Movement of the hinged eyelet triggers a switch that activates an alert.

It is a further object of the invention to provide a fishing pole alert system that provides both an audible and a visual alarm. Accordingly, the fishing pole has a light that illuminates when a bite is detected, and a beeper that is signaled to warn the fisherman who has strayed from the fishing pole.

The invention is a fishing pole bite alarm system, including a pager and a fishing pole having a handle, a mast, a plurality of fixed eyelets on the mast including a distal fixed eyelet, and a movable eyelet assembly hinged to the distal fixed eyelet. A fishing line extends through the fixed eyelets and through the movable eyelet assembly. A tension switch is located within the pole and is attached to the movable eyelet assembly by a control wire. When the fishing line is tensioned, the movable eyelet is pivoted, pulling the control wire in order to activate the tension switch. The tension switch activates a pole light that illuminates the mast and signals the pager to generate and audible alert.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 2 is an enlarged side elevational view with parts broken away, illustrating the fishing pole wherein the line is not under tension and thus a fish bite is not being detected by the present invention.

FIG. 3 is an enlarged side elevational view, similar to FIG. 2, except wherein the line is under tension and a fish bite is being detected by the invention.

DETAILED DESCRIPTION OF THE PREFERRED EMBODIMENTS

Figure 1:
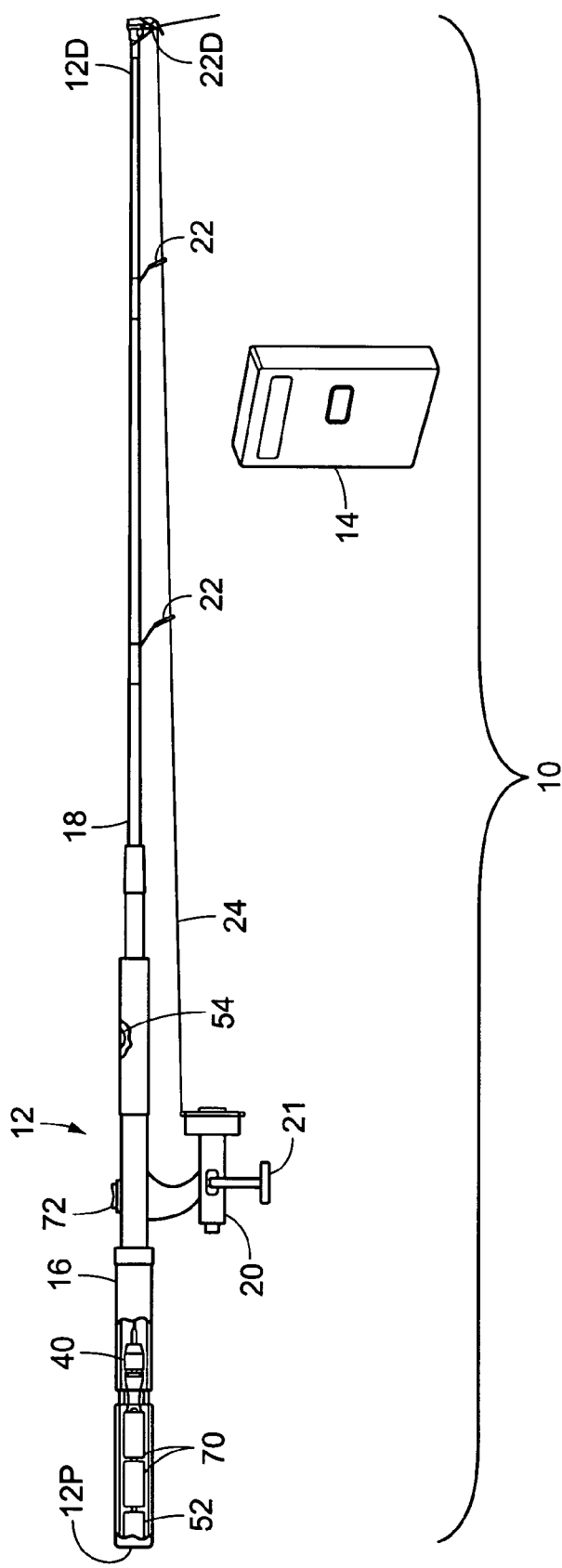
FIG. 1 is a side elevational view, illustrating the bite alert system including a fishing pole and pager unit according to the present invention.

FIG. 1 illustrates a fishing pole bite alert system 10, including a fishing pole 12 and a pager unit 14. The fishing pole 12 has a proximal end 12P and a distal end 12D. A handle 16 is located at the proximal end, and a mast 18 extends substantially from the handle 16 to the distal end 18. The mast 18 tapers to a smaller cross sectional area between the handle and distal end 12D. A plurality of fixed eyelets 22 are attached to the mast 18, and are periodically spaced therealong. The eyelets 22 include a distal fixed eyelet 22D which is closest to the distal end 18.

A reel 20 is attached to the handle 16, and thus is located near the proximal end. The reel acts as a reservoir for a fishing line 24. In particular, the reel 20 stores a length of fishing line sufficient for the fisherman to cast said line any desired distance. The reel 20 has a crank 21 for allowing a fisherman to reel in the fishing line 24 such that it is stored upon the reel 20. The fishing line 24 exits the reel 20, extends through the fixed eyelets 22, and exits the pole at the distal eyelet 22D.

Referring to FIG. 2, the pole 12 includes a movable eyelet assembly 30 at the distal end 12D. The movable eyelet assembly 30 includes a movable eyelet 32, a lever 34, and a hinge 36 that attaches the lever to the distal fixed eyelet 22D. The eyelet 32 is secured to the lever 34 at one end, and a control wire 38 is secured to the lever 34 at an opposite end therefrom. The eyelet 32 is secured to the lever 34 at a slight angle. The mast 18 of the pole 12 has a pole bore 12B that extends longitudinally through the pole 12. The control wire 38 extends from the lever 34, enters the pole bore 12B at the distal end 12D, and extends proximally therefrom.

The lever 34 allows the movable eyelet 32 to selectively enter a position wherein the movable eyelet 32 is aligned substantially coaxially with the fixed eyelets and in particular the distal fixed eyelet 22D as in FIG. 2; and a position wherein the movable eyelet 32 is at a substantially forty-five degree angle with respect to the fixed eyelet 22D as in FIG.

3. In particular, when the fishing line 24 is substantially untensioned, the movable eyelet 32 remains substantially coaxial with the distal fixed eyelet 22D. When a fish bites, however, and begins pulling on the fishing line 24, the tension in the fishing line 24 will act to pivot the movable eyelet 32 toward the distal fixed eyelet 22D, pulling the control wire 38 in the distal direction, initiating a fish bite alert in a manner that will be described hereinafter.

To detect movement of the control wire 38, a tension switch 40 is provided within the pole 12, preferably within the handle 16 near the proximal end 12P. The tension switch 40 includes a core 42 and a collar 44. The core 42 has a plunger 46 having a core contact 48. the collar 44 has a proximal end 44P having a collar contact 45. The core 42 is attached to the control wire 38 and extends through the collar 44, protruding beyond its proximal end 44P. When the control wire 38 is pulled distally, as in FIG. 3, the control wire 38 in turn pulls the core 42 such that the core contact 48 is pulled against the collar contact 45 at the collar proximal end 44P, thus completing an electrical circuit therebetween.

The plunger 46 is biased away from the collar proximal end 44P by a spring 50, whereby the core 42 also pulls the control wire 38 to bias the lever 34 into the position wherein the movable eyelet is substantially coaxial with the distal fixed eyelet 22D. The movable eyelet 32 will remain in this position until tension in the fishing line is sufficient to overcome the spring 50 to pivot the movable eyelet 32 downwardly against the distal fixed eyelet 22D.

Figure 4:
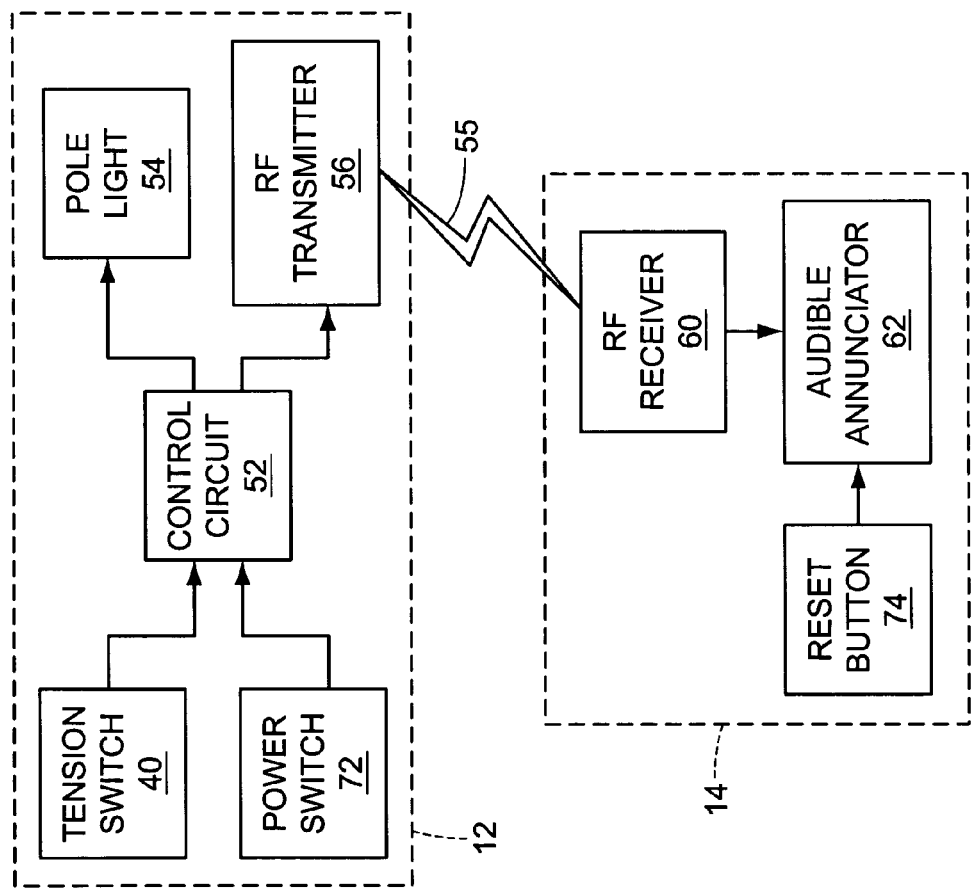
FIG. 4 is a functional block diagram of the present invention.

The tension switch 40 is connected to a control circuit 52 located within the handle 16. Once the control circuit 52 detects closure of the tension switch 40, an alert condition is determined. Referring to FIGS. 1 and 4, in response to the alert condition, a pole light 54 is activated which illuminates the mast, and an RF transmitter 56 is activated to transmit an RF signal 55. The pager unit 14 contains an RF receiver 60 which receives the RF signal 55 and activates an audible annunciator 62. The audible annunciator 62 preferably generates a beeping sound. Accordingly, the fisherman may carry the pager 14, and stray from the fishing pole 12, such that if a fish bite occurs, the fisherman will be notified by the audible alert generated by the pager 14.

The fishing pole 12 has batteries for supplying power to the electrical components thereof, and a power switch 72. The power switch 72 selectively supplies power to the control circuit 52. Note that once an alert condition is established, the pole light 54 will remain illuminated until the power switch 72 is pressed. To terminate the beeping of the pager 14, preferably a reset button 74 is provided with the pager.

In conclusion, herein is fishing pole bite alarm system, for alerting a fisherman that a fish is biting at the fishing line. The invention is illustrated by example in the drawing figures, and throughout the written description. It should be understood that numerous variations are possible, while adhering to the inventive concept. Such variations are contemplated as being a part of the present invention.

What is claimed is:

1. A fishing pole bite alarm system, for use by a fisherman, comprising:

a fishing pole having a proximal end and a distal end, a handle at the proximal end and a mast extending from the handle to the distal end, an RF transmitter, a plurality of fixed eyelets periodically spaced along the mast including a distal fixed eyelet that is closest to the distal end, a reel, and a fishing line extending from the reel through the fixed eyelets;

a movable eyelet assembly, including a movable eyelet through which the fishing line extends, the movable eyelet assembly including a lever that is hingeably attached to the distal fixed eyelet with the movable eyelet attached at one side of the lever so that the movable eyelet moves with respect to the distal fixed eyelet according to tensioning of the fishing line;

a control wire attached to the lever of the movable eyelet assembly at a point on the lever opposite from the movable eyelet, the control wire extending longitudinally through the pole proximally therefrom, the control wire pulled distally by the moveable eyelet assembly when the fishing line is under tension;

a tension switch located within the fishing pole and connected to the control wire, the tension switch having a core and a collar, the collar having a proximal end having a collar proximal contact, the core having a plunger and extending through the collar such that the plunger extends beyond the proximal contact, the plunger has a plunger contact, the plunger biased away from the core proximal end by a spring such that when the control wire is pulled distally by the movable eyelet the plunger and its associated plunger contact is pulled against the collar proximal contact and the tension switch is closed circuited;

a control circuit connected to the tension switch and to the RF transmitter for sening an RF signal when the tension switch is closed circuited;

a pole light, located within the mast and capable of illuminating the mast, the pole light illuminated by the control circuit when the tension switch is activated by movement of the control wire resulting from movement of the movable eyelet assembly resulting from tension in the fishing line; and a pager having an RF receiver and an audible annunciator, the audible annunciator generates an alert sound when the RF receiver detects the RF signal.

* * * * *